(12) United States Patent
Oshima

(10) Patent No.: US 8,068,607 B2
(45) Date of Patent: Nov. 29, 2011

(54) INFORMATION PROCESSING APPARATUS AND INFORMATION PROCESSING METHOD

(75) Inventor: Yukiko Oshima, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 685 days.

(21) Appl. No.: 12/213,682

(22) Filed: Jun. 23, 2008

(65) Prior Publication Data

US 2009/0034731 A1 Feb. 5, 2009

(30) Foreign Application Priority Data

Jul. 31, 2007 (JP) ................................ 2007-199830
Dec. 21, 2007 (JP) ................................ 2007-330258

(51) Int. Cl.
*H04L 29/06* (2006.01)
*G06F 21/00* (2006.01)
(52) U.S. Cl. .......................................... 380/33; 380/270
(58) Field of Classification Search ........................ None
See application file for complete search history.

(56) References Cited

U.S. PATENT DOCUMENTS

| | | | |
|---|---|---|---|
| 6,772,338 B1* | 8/2004 | Hull | 713/168 |
| 2002/0065099 A1 | 5/2002 | Bjorndahl | |
| 2005/0253889 A1 | 11/2005 | Shozaki et al. | |

FOREIGN PATENT DOCUMENTS

| | | |
|---|---|---|
| EP | 1 024 626 | 8/2000 |
| EP | 1 274 194 | 1/2003 |
| EP | 1 659 736 | 5/2006 |
| JP | 2006-173949 | 6/2006 |
| JP | 2006-341600 | 12/2006 |
| JP | 006341600 A1 * | 12/2006 |

OTHER PUBLICATIONS

European Search Report dated Oct. 23, 2009 for corresponding European Application No. 08252226.9.

* cited by examiner

*Primary Examiner* — Gilberto Barron, Jr.
*Assistant Examiner* — Venkat Perungavoor
(74) *Attorney, Agent, or Firm* — Harness, Dickey & Pierce, P.L.C.

(57) ABSTRACT

In an information processing apparatus, a first communication unit receives encrypted data from a portable terminal device when the portable terminal device is within a first communication range, a second communication unit receives decryption information from the portable terminal device when the portable terminal device is within a second communication range shorter than the first communication range, and a decryption unit decrypts the encrypted data with the decryption information.

6 Claims, 9 Drawing Sheets

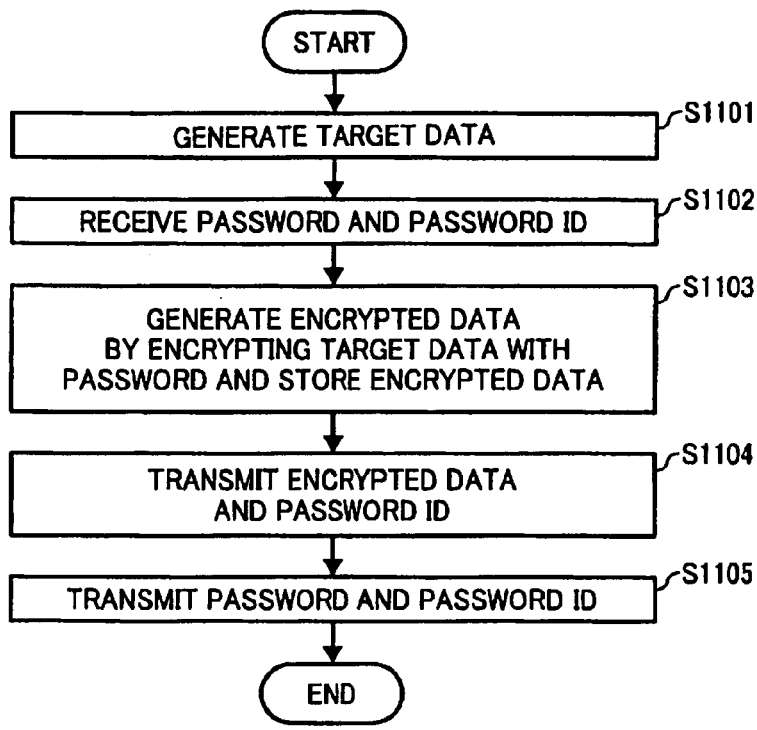
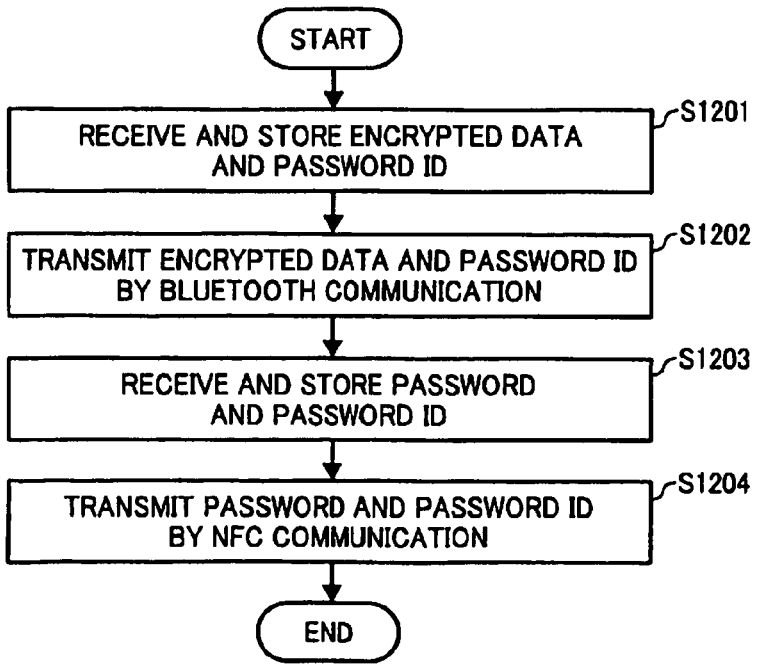

INFORMATION PROCESSING APPARATUS AND INFORMATION PROCESSING METHOD

CROSS-REFERENCE TO RELATED APPLICATIONS

The present application claims priority to and incorporates by reference the entire contents of Japanese priority documents, 2007-199830 filed in Japan on Jul. 31, 2007 and 2007-330258 filed in Japan on Dec. 21, 2007.

BACKGROUND OF THE INVENTION

1. Field of the Invention

The present invention relates to an information processing apparatus and an information processing method.

2. Description of the Related Art

A technology is widely used in which wireless communication is established between a plurality of devices based on Bluetooth (registered trademark), and data is communicated therebetween. This technology allows a user to conveniently connect two devices by wireless. In this technology, it is possible to transmit an electronic document (hereinafter, "data") via a network from an information processing apparatus to a printing apparatus and print the electronic document with the printing apparatus. However, if unencrypted data is transmitted via the network, it can leak to a malicious third party. Particularly, in wireless communication, a malicious third party can obtain data without physically accessing a wired network.

Japanese Patent Application Laid-open No. 2006-341600 discloses storing print-target data in a portable medium in an encrypted manner. To print the encrypted data, a user connects the portable medium to a printing apparatus and inputs a password to the printing apparatus via an operation panel of the portable media or the printing apparatus. The printing apparatus decrypts the encrypted data with the password and prints the data thus obtained. Thus, the data cannot leak to a malicious third party. However, a user must perform operations such as connecting a portable medium to a printing apparatus, and inputting a password, etc., which is burdensome.

SUMMARY OF THE INVENTION

It is an object of the present invention to at least partially solve the problems in the conventional technology.

According to an aspect of the present invention, there is provided an information processing apparatus including a first communication unit that establishes wireless communication with a portable terminal device when the portable terminal device is present within a first communication range, and that receives encrypted data from the portable terminal device; a second communication unit that establishes communication with the portable terminal device when the portable terminal device is present within a second communication range shorter than the first communication range, and that receives decryption information used for decrypting the encrypted data from the portable terminal device; and a decryption unit that decrypts the encrypted data with the decryption information.

According to another aspect of the present invention, there is provided an information processing system comprising:

a portable terminal device; and an information processing apparatus. The portable terminal device including a first communication unit that establishes wireless communication with the information processing apparatus when the information processing apparatus is present within a first communication range, and that transmits encrypted data to the information processing apparatus; and a second communication unit that establishes communication with the information processing apparatus when the information processing apparatus is present within a second communication range shorter than the first communication range, and that transmits decryption information used for decrypting the encrypted data to the information processing apparatus, and the information processing apparatus including a third communication unit that establishes wireless communication with the portable terminal device based on a first communication protocol same as that of the first communication unit when the portable terminal device is present within the first communication range, and that receives the encrypted data from the portable terminal device; a fourth communication unit that establishes communication with the portable terminal device based on a second communication protocol same as that of the second communication unit when the portable terminal device is present within the second communication range, and that receives the decryption information from the portable terminal device; and a decryption unit that decrypts the encrypted data received by the third communication unit with the decryption information received by the fourth communication unit.

According to still another aspect of the present invention, there is provided a method of information processing including first establishing including establishing wireless communication with a portable terminal device when the portable terminal device is present within a first communication range and receiving encrypted data from the portable terminal device; second establishing including establishing communication with the portable terminal device when the portable terminal device is present within a second communication range shorter than the first communication range and receiving decryption information used for decrypting the encrypted data from the portable terminal device; and decrypting the encrypted data with the decryption information.

According to still another aspect of the present invention, there is provided a method of information processing implemented on an information processing system including a client terminal; a portable terminal device; and an information processing apparatus. The method including the client terminal transmitting encrypted data to the portable terminal device; the portable terminal device receiving the encrypted data from the transmitting unit, transmitting the encrypted data to the information processing apparatus when the information processing apparatus is present within a first communication range, and transmitting decryption information used for decrypting the encrypted data to the information processing apparatus when the information processing apparatus is present within a second communication range shorter than the first communication range; and the information processing apparatus receiving the encrypted data from the portable terminal device based on a first communication protocol when the portable terminal device is present within the first communication range, receiving the decryption information from the portable terminal device based on a second communication protocol when the portable terminal device is present within the second communication range, and decrypting the encrypted data with the decryption information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 11 is a flowchart of a transmission process performed by a client terminal shown in FIG. 6;

FIG. 12 is a flowchart of a transmission process performed by a portable terminal device shown in FIG. 6.

DETAILED DESCRIPTION OF THE PREFERRED EMBODIMENTS

Exemplary embodiments of the present invention are explained in detail below with reference to the accompanying drawings.

Figure 1:
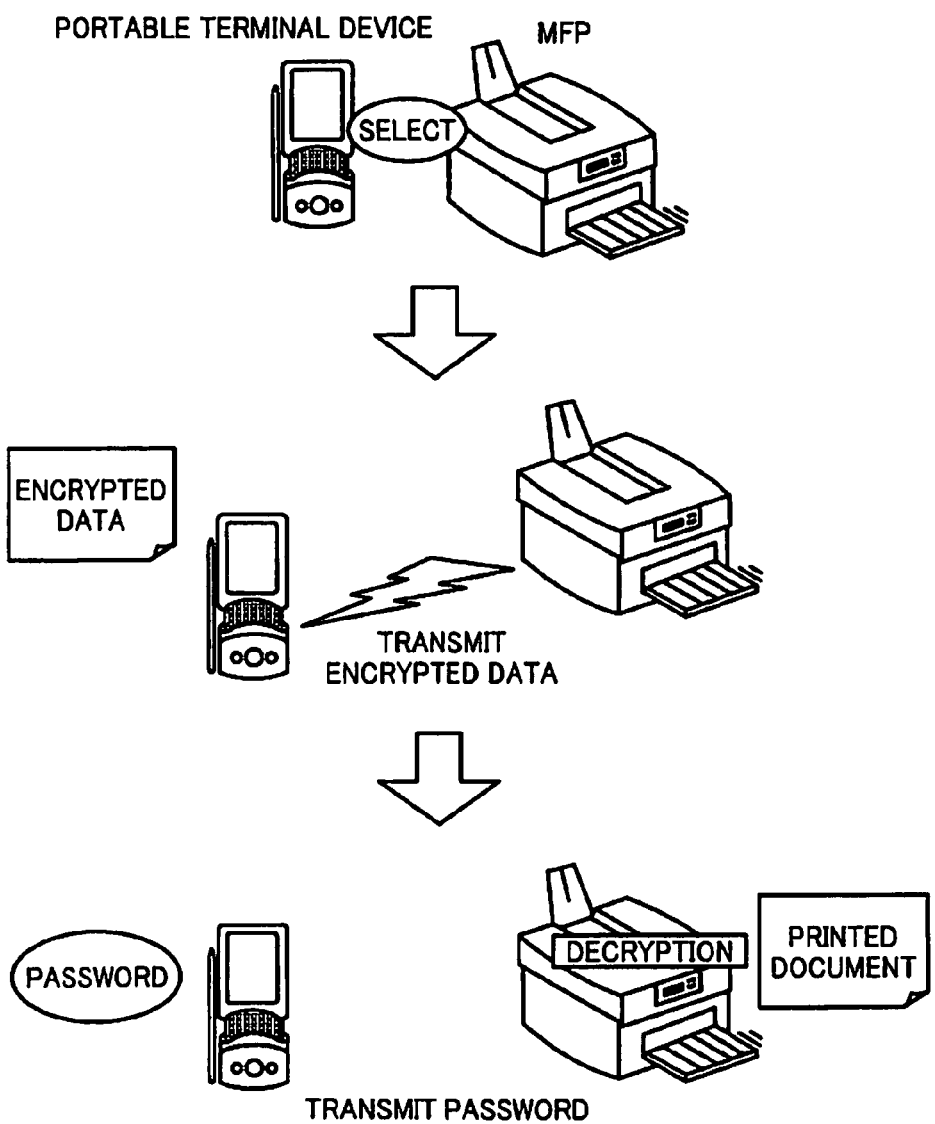
FIG. 1 is a schematic diagram for explaining a process performed by an information processing system according to an embodiment of the present invention.

An information processing system 10 according to a first embodiment of the present invention includes at least one multifunction peripheral (MFP) and at least one portable terminal device. FIG. 1 is a schematic diagram for explaining an example of the information processing performed by the information processing system 10. As shown in FIG. 1, first, a portable terminal device selects one multifunction peripheral (MFP) as an apparatus to print target data. The portable terminal device then transmits encrypted data obtained by encrypting the target data to the MFP, and then transmits a password to the MFP. The MFP decrypts the encrypted data with the password thereby obtaining the original target data, and prints the target data. In this manner, a user can input a password by a simple operation.

Figure 2:
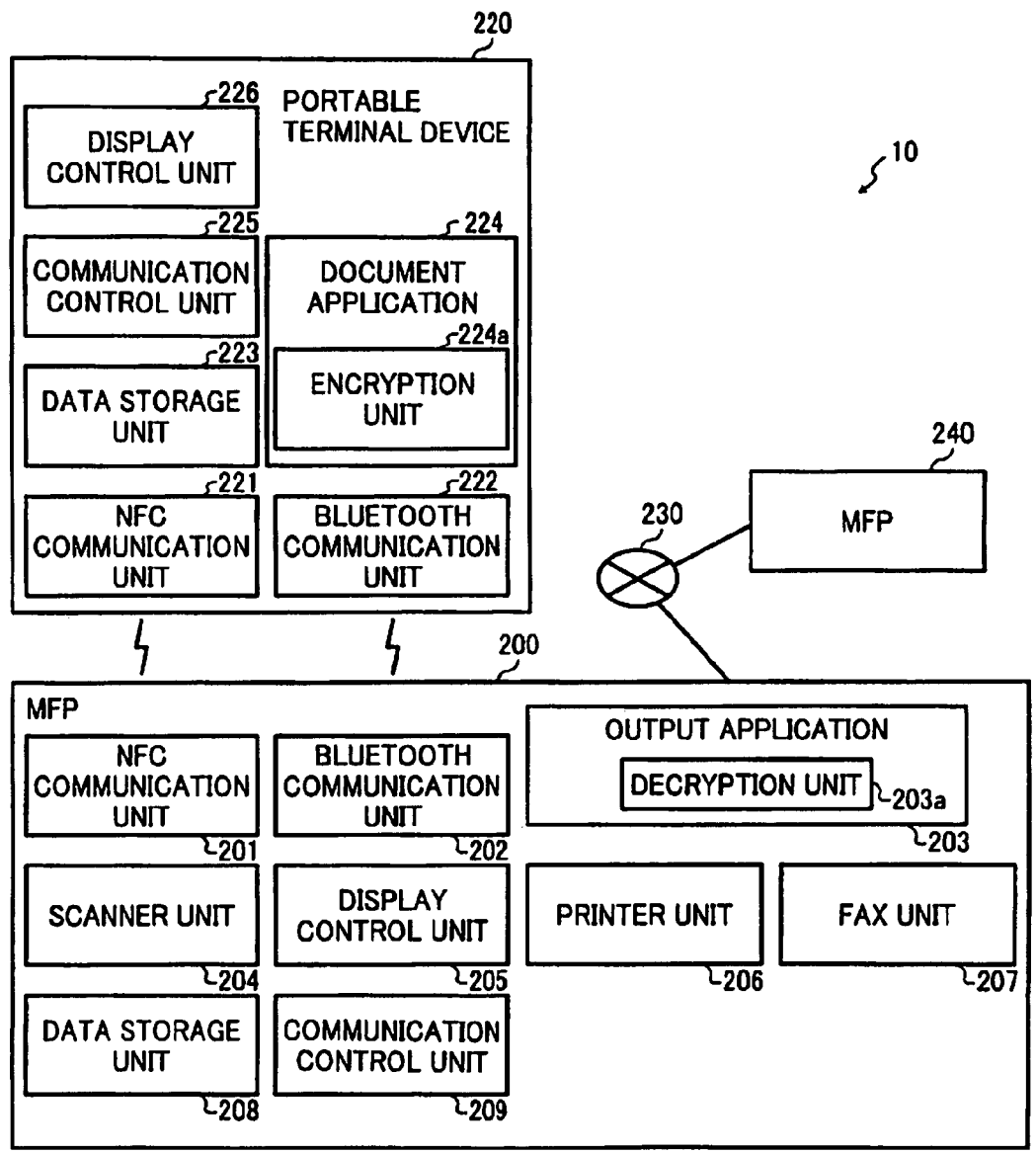
FIG. 2 is a block diagram of an information processing system according to a first embodiment of the present invention.

The configuration of the information processing system 10 is explained in detail below. FIG. 2 is a block diagram of the information processing system 10. The information processing system 10 includes at least one portable terminal device 220 and at least one multifunction peripheral (MFP) 200. An MFP is a device that has functions of copying, facsimileing (FAX), printing, scanning, delivering input image data (for example, image data read by the scanning function, image data generated by the printing function, or image data received by the facsimile function). The MFP 200 is connected to a network 230, and it is connected to an MFP 240, a facsimile machine (not shown), and a client terminal device (not shown) via the network 230.

The MFP 200 and the portable terminal device 220 can communicate with each other by two communication methods: Near Field Communication (NFC) and Bluetooth communication. The MFP 200 includes an NFC communication unit 201, a Bluetooth communication unit 202, an output application 203, a scanner unit 204, a display control unit 205, a printer unit 206, a FAX unit 207, a data storage unit 208, and a communication control unit 209.

The portable terminal device 220 includes an NFC communication unit 221, a Bluetooth communication unit 222, a data storage unit 223, a document application 224, a communication control unit 225, and a display control unit 226. The portable terminal device 220 is, for example, a mobile phone, a personal digital assistant (PDA), a notebook personal computer (PC), or a portable information storage medium.

The structure and operations of the MFP 200 are explained in detail below. The NFC communication unit 201 can perform contactless bi-directional communication with the portable terminal device 220 based on NFC. NFC is a wireless communication protocol, which includes wireless communication using a contactless integrated circuit (IC). Specifically, the NFC communication unit 201 includes a reader/writer (not shown), and/or an IC tag (not shown), including a communication control program for reading information from the NFC communication unit 221 by contactless communication. The communication range of the NFC communication unit 201 is shorter than that of the Bluetooth communication unit 202, i.e., 0 to 10 centimeters. The NFC communication unit 201 performs contactless communication based on the NFC (hereinafter, "NFC communication") at a data transfer rate of 100 kbps to 400 kbps that is lower than a data transfer rate of 1 Mbps to 2 Mbps achieved by wireless communication based on Bluetooth (hereinafter, "Bluetooth communication") by the Bluetooth communication unit 202. Therefore, the NFC communication is usually performed to communicate data in a relatively small size and in a relatively short distance. Communication by the NFC communication unit 201 is not limited to the NFC communication. Any communication protocol, such as the infrared data association (IrDA), can be adopted as long as that communication protocol allows the NFC communication unit 201 to perform wireless communication in a relatively short range, i.e., within a communication range shorter than that of the Bluetooth communication.

When the portable terminal device 220 is present within the communication range of the NFC communication unit 201, the NFC communication unit 201 establishes wireless communication with the NFC communication unit 221, based on the same communication protocol as that of a communication control program of the NFC communication unit 221, and receives a password from the portable terminal device 220. The password is decryption information on, for example, an encryption algorithm used for decrypting encrypted data received from the portable terminal device 220, or an encryption key. The password can be predetermined information assigned to the portable terminal device 220 or identification information (ID) that identifies the user of the portable terminal device 220. The ID of the user can be, for example, an employee ID number. In this manner, the NFC communication unit 201 easily receives the password by the NFC communication from the portable terminal device 220. In other words, the user only needs to move the portable terminal device close to the MFP 200 to input the password to the MFP 200. This simple operation increases convenience.

The NFC communication unit 201 can be configured to receive a password ID from the portable terminal device 220 in addition to the password. The password ID is identification information that identifies the password. Predetermined information assigned to the portable terminal device 220 or the ID of the user of the portable terminal device 220 can be used as the password ID, as long the information is different from the password. With this configuration, the security can be improved further.

The Bluetooth communication unit 202 performs contactless communication with the portable terminal device 220 based on Bluetooth. The Bluetooth communication unit 202 communicates a large amount of data at a high data transfer rate (1 Mbps to 10 Mbps) compared to the NFC communication unit 201 that performs contactless communication based on the NFC. When the distance between the MFP 200 and the portable terminal device 220 is 10 meters or less, the Bluetooth communication unit 202 can perform communication even if there is an obstacle therebetween. In other words, the Bluetooth communication achieves a communication range longer than that achieved by the NFC communication.

The Bluetooth communication unit 202 includes a Bluetooth interface (I/F), such as a transceiver based on Bluetooth, and a communication control unit. The Bluetooth I/F receives encrypted data from the portable terminal device 220. The communication control unit includes a communication control program that performs a process for establishing the Bluetooth communication with the portable terminal device 220 via the Bluetooth I/F before communicating the encrypted data with the portable terminal device 220. Information used for establishing the Bluetooth communication is unique address assigned to the Bluetooth I/F.

As explained above, the Bluetooth communication unit 202 performs wireless communication based on Bluetooth. However, alternatively, wireless communication can be performed based on a local area network (LAN) protocol such as IEEE 802.11a, IEEE 802.11b, IEEE 802.11n, or IEEE 802.11g. In this case, for example, a wireless LAN communication unit is configured with a network board compliant with IEEE 802.11a or IEEE 802.11b, which communicates encrypted data, and a communication control unit that controls establishment of wireless communication based on IEEE 802.11a or IEEE 802.11b and communication of encrypted data. When the distance between devices is 3 meters or less and ultra wide band (UWB) communication is performed therebetween, wireless communication can be performed based on a wireless universal serial bus (USB) protocol at a transfer rate of 480 Mbps equivalent to that of wired communication based on USB2.0. In this case, a wireless USB communication unit includes a UWB device compliant with the wireless USB protocol to communicate data and a communication control unit that controls establishment of wireless communication and communication of encrypted data.

When the portable terminal device 220 is present within a communication range of the Bluetooth communication unit 222, the Bluetooth communication unit 202 establishes communication with the Bluetooth communication unit 222, based on the same protocol as that of a communication control program in the Bluetooth communication unit 222, and receives the encrypted data and the password ID from the portable terminal device 220. Alternatively, for example, the Bluetooth communication unit 202 can be configured to receive the encrypted data only from the portable terminal device 220. Target data from which the encrypted data is generated is confidential data, such as image data, document data, or text data, which is to be processed by, for example, the printer unit 206. As explained above, the target data is encrypted and the encrypted data thus obtained is received by the Bluetooth communication unit 202 from the portable terminal device 220. Therefore, even if wireless communication between the portable terminal device 220 and the MFP 200 is intercepted, a risk of leaking the confidential data can be reduced.

The output application 203 includes a decryption unit 203a. The output application 203 outputs commands to the scanner unit 204, the display control unit 205, the printer unit 206, the FAX unit 207, and the communication control unit 209, receives an instruction from an operation unit (not shown) for outputting data, administers the password and the encrypted data to be stored in the data storage unit 208, and controls an output operation executed by, for example, the printer unit 206.

The decryption unit 203a decrypts the encrypted data received by the Bluetooth communication unit 202 and obtains decrypted data, which is the target data. Specifically, the decryption unit 203a decrypts the encrypted data with the password received by the NFC communication unit 201. The output application 203 can incorporate the decryption unit 203a from the beginning, or the decryption unit 203a can be added to the output application 203 as a plug-in at a later stage.

The decryption unit 203a determines whether the password received by the NFC communication unit 201 is an authentic password. Specifically, when password IDs are received respectively with the password and encrypted data, the decryption unit 203a determines whether the password ID received by the NFC communication unit 201 and that received by the Bluetooth communication unit 202 are identical to each other. When the password ID received by the NFC communication unit 201 and the password ID received by the Bluetooth communication unit 202 are identical to each other, the decryption unit decides that the password is authentic and decrypts the encrypted data with the password and obtains the target data. After the target data is output, the output application 203 deletes the encrypted data and the password from the data storage unit 208 to prevent information leak.

When the password ID received by the NFC communication unit 201 and that received by the Bluetooth communication unit 202 are not identical to each other, the output application 203 immediately deletes both the encrypted data and the password from the data storage unit 208.

The configuration of the output application 203 is not limited to what has been explained above. For example, the output application 203 can be configured not to delete the password and the encrypted data immediately if the NFC communication unit 201 receives the password and the password ID again from the portable terminal device 220. In this case, after receiving the password and the password ID again, the decryption unit 203a determines whether the password ID received by the NFC communication unit 201 and that received by the Bluetooth communication unit 202 are identical to each other. The output application 203 deletes the password and the encrypted data from the data storage unit 208 after receiving the password for a predetermined number of times or after a predetermined time.

Based on a command issued by the output application 203, the display control unit 205 controls input/output of the operation unit. Specifically, if the password and the encrypted data are not deleted from the data storage unit 208, the display control unit 205 displays on the operation unit a request for transmitting the password.

The communication control unit 209 is connected to a network such as a wireless LAN and communicates data with other devices connected to the network based on a predetermined communication protocol. Specifically, the communication control unit 209 establishes communication with the communication control unit 225 and, for example, transmits a massage for requesting transmission of the password.

The scanner unit 204 reads an original using an image capturing unit such as a charge coupled device (CCD). The scanner unit 204 can include an auto document feeder (ADF) for automatically feeding sheets of the original.

The printer unit 206 prints the target data obtained by the decryption unit 203a.

The FAX unit 207 transmits data read by the scanner unit 204 or data obtained by the decryption unit 203a to, for example, the MFP 240, the facsimile machine, or the client terminal that are connected to the network 230. The FAX unit 207 also receives data from the MFP 240, the facsimile machine, or the client terminal via the network 230.

The data storage unit 208 is a buffer memory that temporarily stores therein, for example, the password received by the NFC communication unit 201, the encrypted data received by the Bluetooth communication unit 202, the target data obtained by the decryption unit 203a, image data read by the scanner unit 204, and image data received from an external device via the network 230.

The structure and operations of the portable terminal device 220 are explained in detail below. When the portable terminal device 220 is present within the communication range of the NFC communication unit 201, the NFC communication unit 221 establishes communication with the NFC communication unit 201, based on the same communication protocol as that of the communication control protocol of the NFC communication unit 201, and transmits the password and the password ID to the MFP 200. Alternatively, the NFC communication unit 221 can transmit only the password to the MFP 200.

The NFC communication unit 221 includes an NFC chip (not shown) that includes the communication control program for controlling establishment of communication and data communication, and an IC tag (not shown) in which the password and the password ID are stored. When the NFC communication unit 221 is present within the communication range of the MFP 200, the NFC communication unit 221 establishes with the MFP 200. Thereafter, the NFC communication unit 201 reads the information from the IC tag of the NFC communication unit 221, i.e., the information is "transmitted" from the NFC communication unit 221 to the NFC communication unit 201.

The NFC chip of the NFC communication unit 221 can be incorporated in a contactless IC card. In this case, the password and the password ID can be transmitted to the MFP 200 independently from the portable terminal device 220.

As explained above, the NFC communication unit 221 includes the IC tag in which the password and the password ID are stored, and the NFC communication unit 201 includes a reader/writer to read the password and the password ID. Alternatively, the NFC communication unit 221 can include a reader/writer and the NFC communication unit 201 can include an IC tag. In this case, the password and the password ID are stored in the NFC communication unit 201. When the portable terminal device 220 is moved close to the NFC communication unit 201, communication is established therebetween and the NFC communication unit 221 receives the password and the password ID from the NFC communication unit 201 based on a command issued by the document application 224. In other words, the NFC communication unit 221 reads the password and the password ID from the IC tag of the NFC communication unit 201. Thereafter, the document application 224 processes the password and the password ID. Furthermore, alternatively, each of the NFC communication unit 221 and the NFC communication unit 201 can include an IC tag and a reader/writer.

When the Bluetooth communication unit 222 establishes communication with the Bluetooth communication unit 202 based on the same communication protocol as that of a communication control program of the Bluetooth communication unit 202, the Bluetooth communication unit 222 transmits the encrypted data and the password ID that are stored in the data storage unit 223 to the MFP 200. Alternatively, for example, the Bluetooth communication unit 222 can be configured to transmit the encrypted data only.

The document application 224 includes an encryption unit 224a. The document application 224 outputs a command to, for example, the display control unit 226, generates data, and stores the target data, the password, the password ID, and the encrypted data in the data storage unit 223. Furthermore, the document application 224 receives, for example, the password and the password ID from an operation unit (not shown), and stores the password and the password ID in the IC tag of the NFC communication unit 221. The encryption unit 224a encrypts target data stored in the data storage unit 223 with the password received via the operation unit by secret key cryptography, and generates encrypted data. The encrypted data is temporarily stored in the data storage unit 223.

The communication control unit 225 is connected to the network such as a wireless LAN and communicates data with other devices connected to the network based on a predetermined communication protocol. Specifically, the communication control unit 225 establishes communication with the communication control unit 209 and, for example, receives a message for requesting transmission of the password. The communication control unit 225 accesses external data via the network and obtains the data. The communication control unit 225 can be, for example, a wired unit or a replicator that synchronizes data with a client terminal.

Upon receiving a command from the document application 224, the display control unit 226 controls input/output of the operation unit. Specifically, upon receiving a message via the communication control unit 225 for requesting the MFP 200 to transmit the password, the document application 224 issues the command to the display control unit 226. Upon receiving the command, the display control unit 226 displays the message for requesting transmission of the password on the operation unit.

The data storage unit 223 is a buffer memory that temporarily stores therein, for example, the target data, the password and the password ID input via the operation unit, and the encrypted data generated by the encryption unit 224a.

Figure 3:
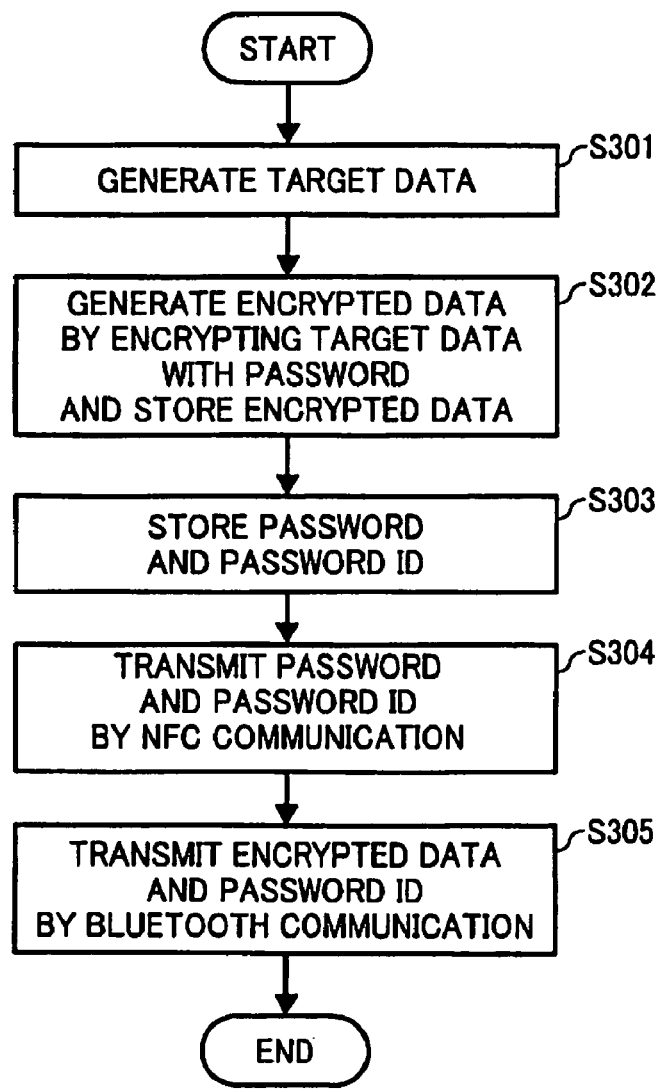
FIG. 3 is a flowchart of a transmission process performed by a portable terminal device shown in FIG. 1.

A transmission process for transmitting encrypted data and a password, which is performed by the portable terminal device 220, is explained below. FIG. 3 is a flowchart of the transmission process.

The document application 224 generates target data based on an instruction from the operation unit, and stores the target data in the data storage unit 223 (Step S301). The encryption unit 224a encrypts the target data with a password thereby generating encrypted data, and temporarily stores the encrypted data in the data storage unit 223 (Step S302).

The document application 224 stores the password and a password ID in the IC tag of the NFC communication unit 221 and the data storage unit 223 (Step S303). When the user of the portable terminal device 220 moves to a position within the communication range of the NFC communication unit 201, the NFC communication unit 201 transmits the password and the password ID from the IC tag to the MFP 200 (Step S304). Subsequently, the Bluetooth communication unit 222 transmits the encrypted data and the password ID that are temporarily stored in the data storage unit 223 to the MFP 200 (Step S305).

As explained above, the NFC communication unit 221 transmits the password and the password ID to the MFP 200, and then, the Bluetooth communication unit 222 transmits the encrypted data and the password ID thereto. Alternatively, the encrypted data and the password ID can be transmitted to the MFP 200 beforehand. In this case, the NFC communication unit 221 transmits the password and the password ID to the MFP 200 when the user of the portable terminal device 220 moves within a communication range of the NFC communication unit 201.

Figure 4:
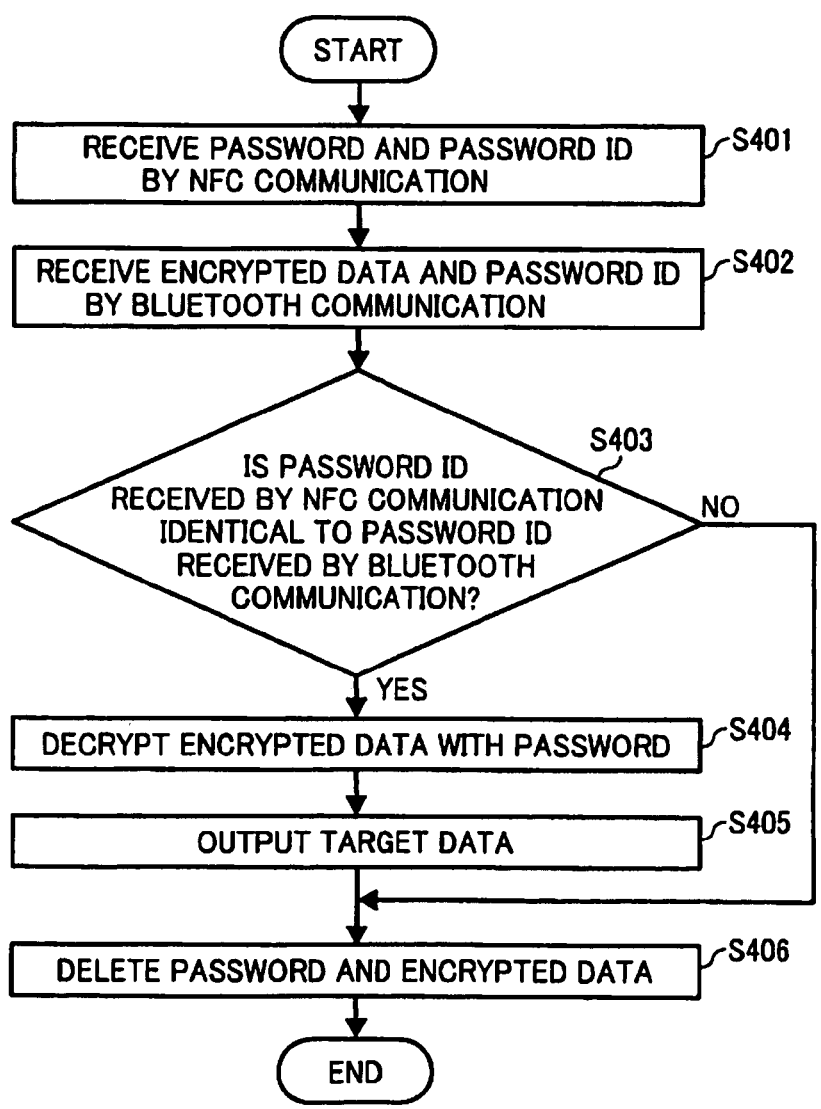
FIG. 4 is a flowchart of an output process performed by an MFP shown in FIG. 1.

An output process for decrypting encrypted data and outputting target data obtained by the decryption, which is performed by the MFP 200, is explained below. FIG. 4 is a flowchart of the output process.

When the portable terminal device 220 is present within the communication range of the NFC communication unit 201, the NFC communication unit 201 establishes communication with the NFC communication unit 221 and receives the password and the password ID from the portable terminal device 220 (Step S401). Thereafter, the Bluetooth communication unit 202 receives the encrypted data and the password ID from the portable terminal device 220 (Step S402). The output application 203 stores the password and the encrypted data in the data storage unit 208. As explained above, the MFP 200 receives the password and the password ID, and then, receives the encrypted data and the password ID. Alternatively, the MFP 200 can receive the encrypted data and the password ID beforehand. In this case, the MFP 200 receives the password and the password ID when the portable terminal device 220 is positioned within the communication range of the NFC communication unit 201.

The decryption unit 203a determines whether the password ID received by the NFC communication unit 201 and the password ID received by the Bluetooth communication unit 202 are identical to each other (Step S403). When the password and the encrypted data are received without the password ID, Step S403 is skipped and the decryption unit 203a decrypts the encrypted data with the password.

When the password ID received by the NFC communication unit 201 and that received by the Bluetooth communication unit 202 are not identical to each other (NO at Step S403), the output application 203 deletes the password and the encrypted data from the data storage unit 208 (Step S406).

On the other hand, when the password ID received by the NFC communication unit 201 and that received by the Bluetooth communication unit 202 are identical to each other (YES at Step S403), the decryption unit 203a decrypts the encrypted data with the password thereby obtaining the target data (Step S404).

The output application 203 instructs the printer unit 206 to output, i.e. print, the target data (Step S405). After the printer unit 206 prints the data, the output application 203 deletes the password and the encrypted data from the data storage unit 208 (Step S406).

As explained above, the portable terminal device 220 transmits the password with which the encrypted data is decrypted to the MFP 200 by the NFC communication. In other words, by only moving the portable terminal device 220 close to the MFP 200, it is possible to input the password to the MFP 200. Because the target data is encrypted and the encrypted data is transmitted from the portable terminal device 220 to the MFP 200, the risk of leaking the target data can be reduced even if the wireless communication between the portable terminal device 220 and the MFP 200 is intercepted.

Although the printing function is explained above as a function of the MFP 200, the MFP 200 can use a different function such as the facsimile function. For example, when the facsimile function is used, the target data obtained by the decryption can be transmitted to, for example, the MFP 240 or the facsimile machine.

Figure 5:
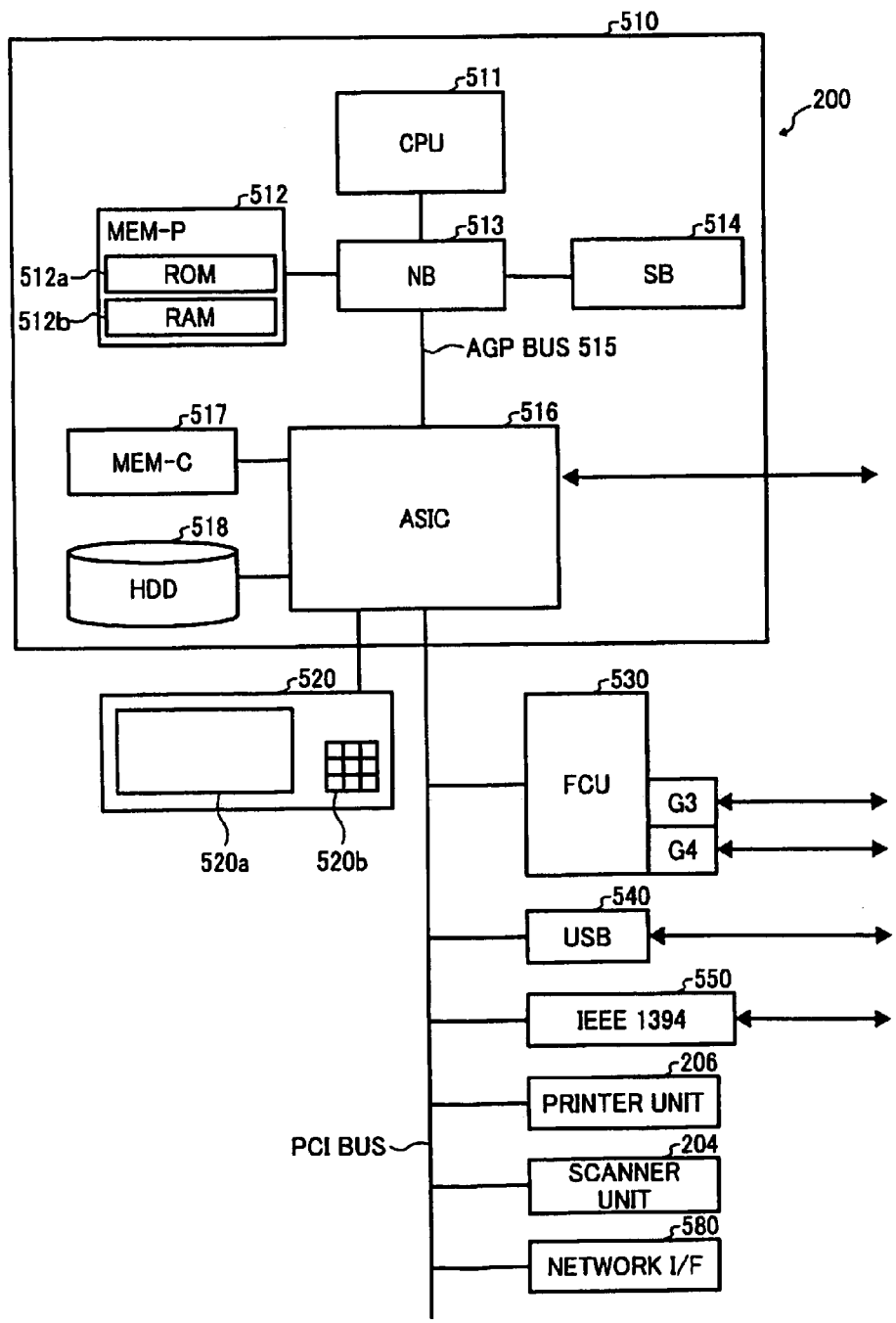
FIG. 5 is a schematic diagram of a hardware configuration of the MFP shown in FIG. 1.

A hardware configuration of the MFP 200 is explained below with reference to FIG. 5. As shown in FIG. 5, the MFP 200 includes a controller 510, the printer unit 206, and the scanner unit 204 that are connected with each other via a peripheral component interconnect (PCI) bus. The controller 510 controls the MFP 200, drawing, communication, and input from an operation unit 520. The printer unit 206 or the scanner unit 204 performs image processing including gamma control for correcting gradation or error distribution by binarization. The operation unit 520 includes a keyboard unit 520b that receives key input by an operator and an operation display unit 520a that displays, for example, image information of an original read by the scanner unit 204 on a liquid crystal display (LCD) and receives an input by the operator via a touch panel.

The MFP 200 can switch among a document box function, a copying function, a printing function, a scanning function, and a facsimile function using an application switch key on the operation unit 520. For example, when the document box function is selected, the MFP 200 is in a document box mode. Similarly, the MFP 200 is in a copy mode when the copying function is selected, is in a print mode when the printing function is selected, is in a scan mode when the scanning function is selected, and in a facsimile mode when the facsimile function is selected.

The controller 510 includes a central processing unit (CPU) 511, a system memory (MEM-P) 512, a north bridge (NB) 513, a south bridge (SB) 514, an application specific integrated circuit (ASIC) 516, a local memory (MEM-C) 517, and a hard disk drive (HDD) 518. The NB 513 and the ASIC 516 are connected via an accelerated graphics port (AGP) bus 515.

The CPU 511 controls the MFP 200. The CPU 511 includes a chip set that includes the NB 513, the MEM-P 512, and the SB 514, and the CPU 511 is connected to other devices via the chip set.

The NB 513 connects the CPU 511 to the MEM-P 512, the SB 514, and the AGP bus 515. The NB 513 includes a memory controller, a protocol control information (PCI) master, and an AGP target.

The MEM-P 512 is a system memory that includes a read only memory (ROM) 512a and a random access memory (RAM) 512b. The ROM 512a stores therein data and a computer program for controlling the CPU 511. The RAM 512b is used for, for example, loading a computer program and data or drawing by a printer.

The SB 514 connects the NB 513 to the PCI device and a peripheral device. The SB 514 is connected to the NB 513 via the PCI bus. In addition, a network I/F 580 is also connected to the PCI bus.

The ASIC 516 is an IC including a hardware component for image processing, and it is used for image processing. The ASIC 516 serves as a bridge that connects the AGP bus 515, the PCI bus, the HDD 518, and the MEM-C 517 to each other. The ASIC 516 includes a PCI target, an AGP master, an arbiter (ARB) that has a main function of the ASIC 516, a memory controller that controls the MEM-C 517, a plurality of direct memory controllers (DMAC) that rotates image data based on a hardware logic, and a PCI unit that transfers data between the printer unit 206 and the scanner unit 204 via the PCI bus. A facsimile control unit (FCU) 530, a USB 540, and an IEEE 1394 interface 550 are connected to the ASIC 516 via the PCI bus.

The MEM-C 517 is a local memory used as a buffer for images to be copied and a code buffer. The HDD 518 stores therein image data, a computer program for controlling the CPU 511, font data, and forms.

The AGP bus 515 is a bus interface for a graphics accelerator card developed for increasing a rate of processing graphics. By directly accessing the MEM-P 512 with a high throughput, the graphics accelerator card can achieve high speed processing.

The computer program executed by the MFP 200 is stored in, for example, a ROM beforehand. The computer program can be stored as an installable or executable file in a computer-readable recoding medium such as a compact disk read only memory (CD-ROM), a flexible disk (FD), a compact disk recordable (CD-R), or a digital versatile disk (DVD).

The computer program executed by the MFP 200 can be stored in a computer connectable to a network such as the Internet such that the computer program is downloaded via the network. Alternatively, the computer program can be delivered or distributed via a network such as the Internet.

The computer program executed by the MFP 200 has a module configuration and includes each unit such as the NFC communication unit 201, the Bluetooth communication unit 202, the output application 203, the display control unit 205, the FAX unit 207, the data storage unit 208, and the communication control unit 209. As hardware, the CPU 511 reads the computer program from the ROM and executes the computer program, so that the units of the MFP 200 are loaded and realized on a main storage unit.

The computer program executed by the portable terminal device 220 is stored in, for example, a ROM in advance. The computer program can be stored as an installable or executable file in a computer-readable recoding medium such as a CD-ROM, a FD, a CD-R, or a DVD.

Alternatively, the computer program can be stored in a computer connectable to a network such as the Internet such that the computer program can be downloaded via the network. Alternatively, the computer program can be delivered or distributed via a network such as the Internet.

The computer program has a module configuration and includes each unit such as the NFC communication unit 221, the Bluetooth communication unit 222, the document application 224, the data storage unit 223, the communication control unit 225, and the display control unit 226. As hardware, a CPU reads the computer program from the ROM and executes the computer program, so that the units of the portable terminal device 220 are loaded and realized on a main storage unit.

Although the MFP 200 is explained as an example in the above explanation, various types of apparatuses including a copier, a facsimile machine, and a printer can be used instead of the MFP 200.

Figure 6:
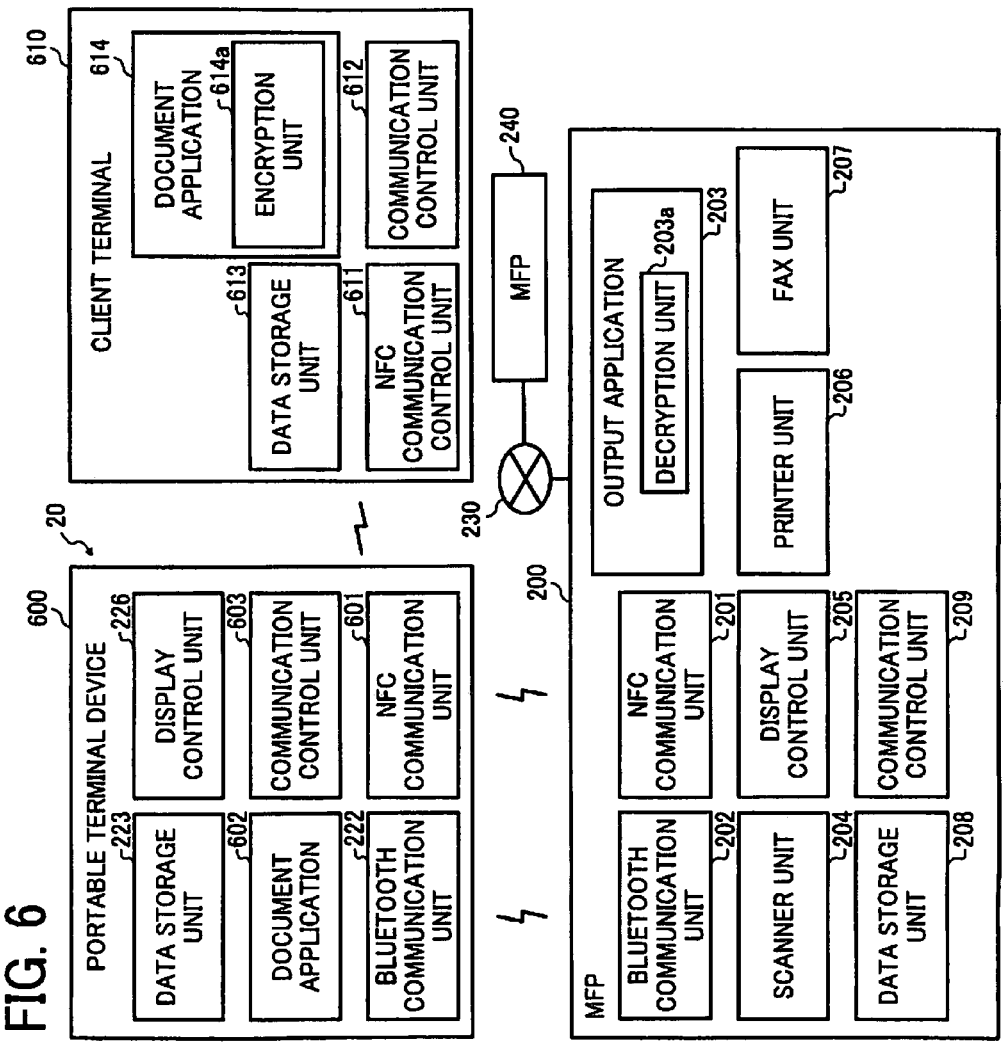
FIG. 6 is a block diagram of an information processing system according to a second embodiment of the present invention.
Figure 7:
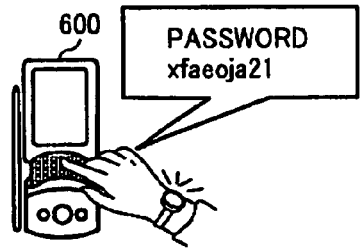
FIG. 7 is a schematic diagram for explaining an example in which a user inputs a password input via an operation unit of a portable terminal device.
Figure 8:
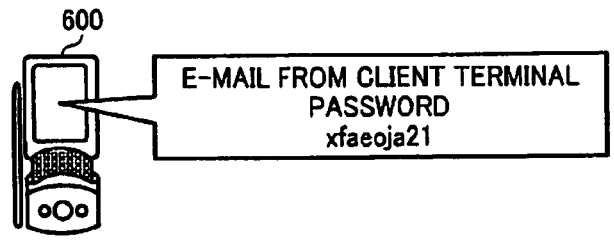
FIG. 8 is a schematic diagram for explaining an example in which a portable terminal device receives a password by receiving an E-mail via a network from a client terminal device.
Figure 9:
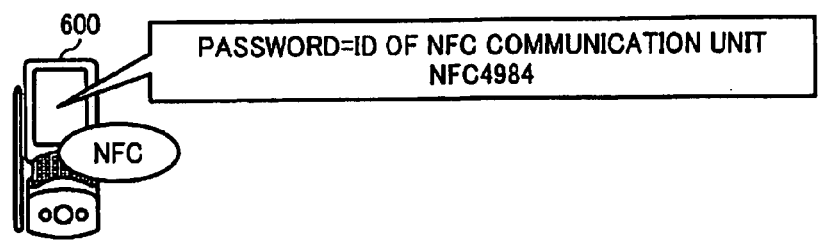
FIG. 9 is a schematic diagram for explaining an example in which an ID of an NFC communication unit of a portable terminal device is input as a password.
Figure 10:
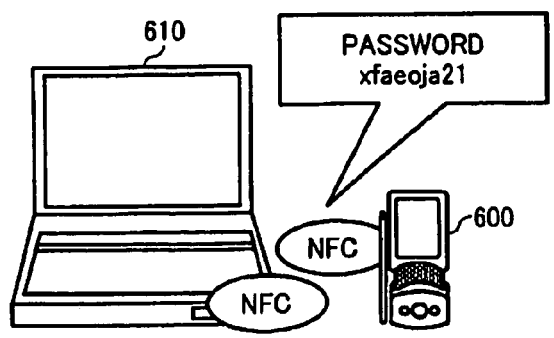
FIG. 10 is a schematic diagram for explaining an example in which a password received from an NFC communication unit of a client terminal device is input to an NFC communication unit of an MFP.

An information processing system 20 according to a second embodiment of the present invention is explained below, focusing on different aspects and configuration from the information processing system 10. The explanation on other aspects and configuration that is basically the same as those of the information processing system 10 is not repeated below. FIG. 6 is a block diagram of the information processing system 20.

The information processing system 20 includes the MFP 200, a portable terminal device 600, and a client terminal 610. The MFP 200 includes the NFC communication unit 201, the Bluetooth communication unit 202, the output application 203, the scanner unit 204, the display control unit 205, the printer unit 206, the FAX unit 207, the data storage unit 208, and the communication control unit 209.

The portable terminal device 600 includes an NFC communication unit 601, the Bluetooth communication unit 222, a document application 602, a communication control unit 603, the data storage unit 223, and the display control unit 226. The configurations and functions of the Bluetooth communication unit 222, the data storage unit 223, and the display control unit 226 are the same as those of the portable terminal device 220, and the explanation thereof is not repeated below.

The client terminal 610 includes an NFC communication unit 611, a communication control unit 612, a data storage unit 613, and a document application 614.

The structure and operations of the portable terminal device 600 is explained in detail below. When the NFC communication unit 601 is present within a communication range of the NFC communication unit 611, the NFC communication unit 601 establishes communication with the NFC communication unit 611 based on the same communication protocol as that of a communication control program of the NFC communication unit 611. The NFC communication unit 601 includes a reader/writer (not shown), and/or an IC tag (not shown), including a communication control program for reading a password and a password ID from the NFC communication unit 611 by contactless communication. The NFC communication unit 601 reads the password and the password ID from the NFC communication unit 611. Alternatively, the NFC communication unit 601 can be configured to read only the password. The document application 602 stores in the data storage unit 223 the password and the password ID that are read from the NFC communication unit 611 by the NFC communication unit 601.

When the NFC communication unit 601 is present within a communication range of the NFC communication unit 201, the NFC communication unit 601 establishes communication with the NFC communication unit 201 based on the same communication protocol as that of a communication control program of the NFC communication unit 201. Thereafter, the reader/writer (not shown) of the NFC communication unit 601 writes the password and the password ID in the IC tag of the NFC communication unit 201 based on a command issued by the document application 602, i.e., the NFC communication unit 201 "receives" the password and the password ID from the NFC communication unit 601.

The document application 602 is different from the document application 224 because the document application 602 does not include an encryption unit. Specifically, the document application 602 outputs a command to, for example, the communication control unit 603 and the display control unit 226. The document application 602 generates data, and stores in the data storage unit 223 target data to be processed, the password, the password ID, and encrypted data generated by encrypting the target data. The document application 602 also receives, for example, a password and a password ID via an operation unit (not shown), the communication control unit 603, or the NFC communication unit 601.

FIGS. 7 to 10 are schematic diagrams for explaining various ways in which the portable terminal device 600 can receive a password. In the example shown in FIG. 7, a user of the portable terminal device 600 inputs a password via the operation unit (not shown) of the portable terminal device 600. In the example shown in FIG. 8, the communication control unit 603 receives an E-mail that contains a password from the client terminal 610 via the network. In the example shown in FIG. 9, an ID of the NFC communication unit 601 is input to the portable terminal device 600 as a password. In the example shown FIG. 10, the NFC communication unit 601 receives a password from the NFC communication unit 611 of the client terminal 610.

Returning to the explanation of FIG. 6, the communication control unit 603 is connectable to a network (not shown) such as a wireless LAN, and communicates with other devices that are connected to the network based on a predetermined communication protocol. Specifically, the communication control unit 603 establishes communication with the communication control unit 612, and, for example, receives the encrypted data therefrom.

The structure and the operation of the client terminal 610 are explained in detail below. When the client terminal 610 is present within a communication range of the NFC communication unit 601, the NFC communication unit 611 establishes communication with the NFC communication unit 601 based on the same communication protocol as that of a communication control program of the NFC communication unit 601, and transmits the password and the password ID to the NFC communication unit 601. Alternatively, the NFC communication unit 611 can be configured to transmit only the password to the NFC communication unit 601.

Specifically, the NFC communication unit 611 includes an NFC chip (not shown) that includes a communication control program for controlling establishment of communication and data communication, and an IC tag (not shown) in which the password and the password ID are stored. When the NFC communication unit 611 is in the communication range of the NFC communication unit 601, the NFC communication unit 611 establishes communication with the NFC communication unit 601. Thereafter, the password and the password ID are transmitted from the NFC communication unit 611 to the NFC communication unit 601, i.e., the NFC communication unit 601 reads the information from the IC tag of the NFC communication unit 611.

The NFC chip of the NFC communication unit 611 can be incorporated in a contactless IC card. In this case, the password and the password ID can be transmitted to the portable terminal device 600 independently from the client terminal 610.

As explained above, the NFC communication unit 611 includes the IC tag in which the password and the password ID are stored, and the NFC communication unit 601 includes a reader/writer to read the password and the password ID. Alternatively, the NFC communication unit 611 can include a reader/writer and the NFC communication unit 601 can include an IC tag. In this case, the password and the password ID are stored in the NFC communication unit 601. When the NFC communication unit 611 is in the communication range of the NFC communication unit 601 and communication is established therebetween, the reader/writer of the NFC communication unit 611 reads the password and the password ID from the IC tag of the NFC communication unit 601 based on a command issued by the document application 614. Thereafter, the document application 614 processes the password and the password ID. Alternatively, each of the NFC communication unit 611 and the NFC communication unit 601 can include a reader/writer and an IC tag.

When communication is established between the communication control unit 612 and the Bluetooth communication unit 222, the communication control unit 612 transmits the encrypted data and the password ID that are temporarily stored in the data storage unit 613 to the portable terminal device 600. Alternatively, the communication control unit 612 can be configured to transmit only the encrypted data to the portable terminal device 600.

The document application 614 includes an encryption unit 614a. The document application 614 outputs a command to, for example, the communication control unit 612, generates data, and stores in the data storage unit 613 the target data, the password, the password ID, and the encrypted data. The document application 614 also receives a password, a password ID, and the like from an operation unit (not shown), and stores the password and the password ID in the IC tag of the NFC communication unit 611. The encryption unit 614a encrypts the target data stored in the data storage unit 613 with a password received from the operation unit by secret key cryptography, and generates encrypted data. The encrypted data is temporarily stored in the data storage unit 613.

The communication control unit 612 is connectable to the network such as a wireless LAN, and communicates data with other devices that are connected to the network based on a predetermined communication protocol. Specifically, the communication control unit 612 establishes communication with the communication control unit 603, and, for example, communicates the password and the password ID therebetween. Furthermore, the communication control unit 612 accesses external data via the network and obtains the external data. The communication control unit 612 can be, for example, a wired unit, or a replicator that synchronizes data with a client terminal.

The data storage unit 613 is a buffer memory. In response to a command from the document application 614, the data storage unit 613 temporarily stores therein, for example, the target data, the password and the password ID that are received from the operation unit, and the encrypted data generated by the encryption unit 614a.

A transmission process for transmitting encrypted data and a password, which is performed by the client terminal 610, is explained below. FIG. 11 is a flowchart of the transmission process.

The document application 614 generates target data based on an instruction from the operation unit, and stores the target data in the data storage unit 613 (Step S1101). The document application 614 receives a password input via the operation unit and a password ID thereof (Step S1102). The document application 614 stores the password and the password ID in the data storage unit 613. If the password and the password ID are to be transmitted to the portable terminal device 600 by the NFC communication unit 611, the password and the password ID are stored in the IC tag of the NFC communication unit 611. The encryption unit 614a encrypts the target data stored in the data storage unit 613 thereby generating encrypted data, and temporarily stores the encrypted data in the data storage unit 613 (Step S1103).

The communication control unit 612 transmits the encrypted data and the password ID in the data storage unit 613 to the portable terminal device 600 (Step S1104). When the user of the portable terminal device 600 moves with the portable terminal device 600 so that the NFC communication unit 611 of the client terminal 610 is present within the communication range of the NFC communication unit 601 of the portable terminal device 600, the NFC communication unit 611 transmits the password and the password ID to the portable terminal device 600 (Step S1105). As explained above, the password and the password ID are transmitted to the portable terminal device 600 by the NFC communication. Alternatively, the communication control unit 612 can transmit the password and the password ID to the portable terminal device 600 via the network.

A transmission process for transmitting encrypted data and a password, which is performed by the portable terminal device 600, is explained below. FIG. 12 is a flowchart of the transmission process.

The document application 602 temporarily stores in the data storage unit 223 the encrypted data and the password ID that are received from the client terminal 610 (Step S1201). The Bluetooth communication unit 222 transmits the encrypted data and the password ID in the data storage unit 223 to the MFP 200 (Step S1202).

The document application 602 stores in the data storage unit 223 the password and the password ID received from the client terminal 610 (Step S1203). When the user of the portable terminal device 600 moves with the portable terminal device 600 so that the portable terminal device 600 is present within the communication range of the NFC communication unit 201, the NFC communication unit 601 transmits the password and the password ID in the data storage unit 223 to the MFP 200 (Step S1204).

As explained above, the portable terminal device 600 first transmits the encrypted data and the password ID to the MFP 200, and then transmits the password and the password ID thereto. Alternatively, the encrypted data and the password ID can be transmitted to the MFP 200 beforehand. In this case, after it is confirmed that the password and the password ID have been transmitted to the MFP 200, the encrypted data and the password ID are transmitted thereto.

Figure 13:
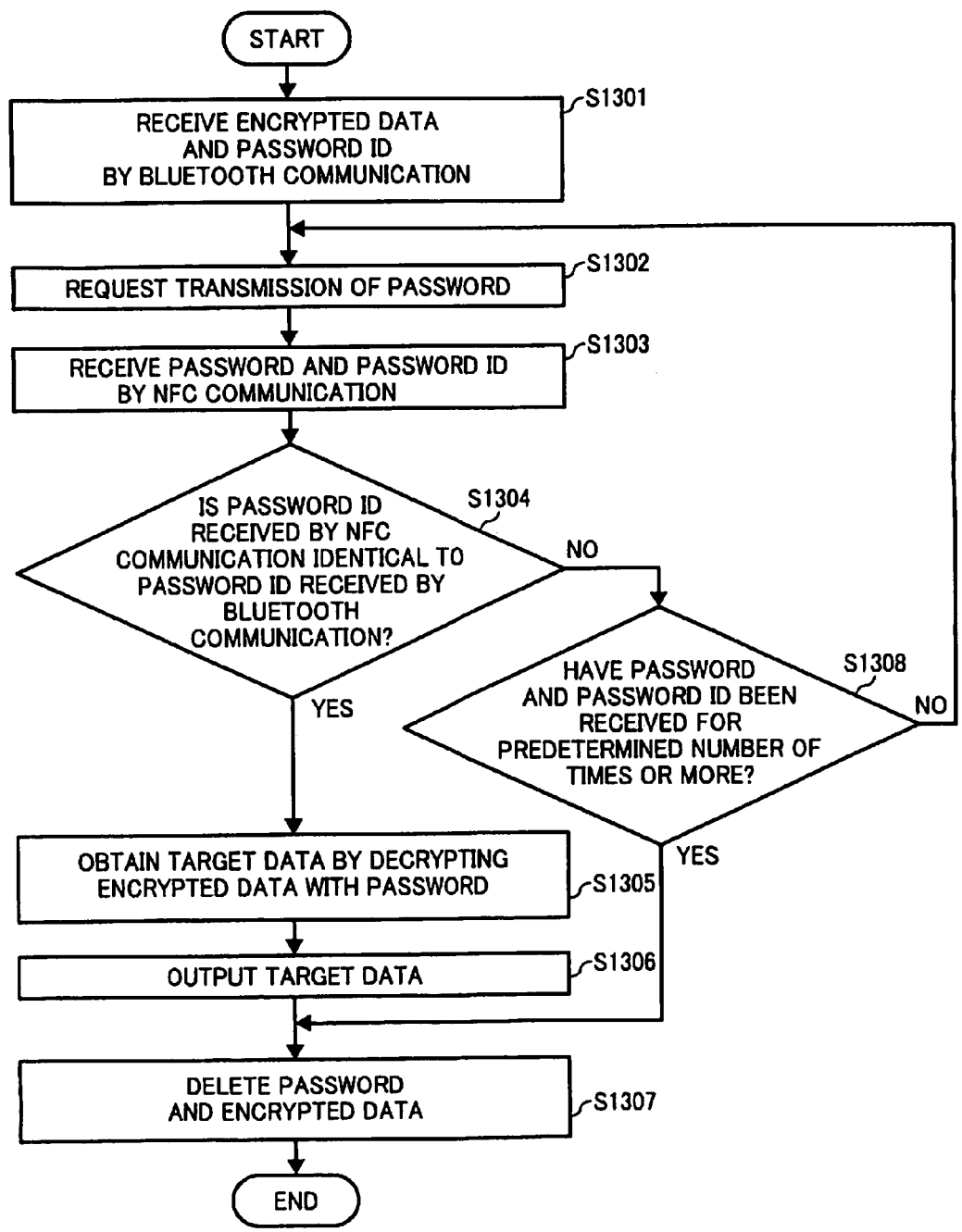
FIG. 13 is a flowchart of an output process performed by an MFP shown in FIG. 6.

An output process for decrypting encrypted data and outputting target data obtained by the decryption, which is performed by the MFP 200, is explained below. FIG. 13 is a flowchart of the output process.

The Bluetooth communication unit 202 receives the encrypted data and the password ID from the portable terminal device 600 (Step S1301). The output application 203 stores the encrypted data in the data storage unit 208. Upon receiving the encrypted data and the password ID from the portable terminal device 600, the display control unit 205 displays on the operation unit a message for requesting transmission of the password and waits for reception of the password and the password ID from the portable terminal device 600 (Step S1302).

When the portable terminal device 600 is present within a communication range of the NFC communication unit 201, the NFC communication unit 201 establishes communication with the NFC communication unit 601 and receives the password and the password ID from the portable terminal device 600 (Step S1303). The output application 203 stores the password and the password ID in the data storage unit 208.

The decryption unit 203a determines whether the password ID received by the NFC communication unit 201 and the password ID received by the Bluetooth communication unit 202 are identical to each other (Step S1304). However, when the password and the encrypted data are received without the password ID, Step S1304 is skipped and the encrypted data is decrypted with the password.

When the password ID received by the NFC communication unit 201 and the password ID received by the Bluetooth communication unit 202 are not identical to each other (NO at Step S1304), the output application 203 determines whether the NFC communication unit 201 has received the password and the password ID for a predetermined number of times or more (Step S1308). When the NFC communication unit 201 has received the password and the password ID for the predetermined number of times or more (YES at Step S1308), the output application 203 deletes the password and the encrypted data from the data storage unit 208 (Step S1307).

On the other hand, when the password ID received by the NFC communication unit 201 and the password ID received by the Bluetooth communication unit 202 are identical to each other (YES at Step S1304), the decryption unit 203a decrypts the encrypted data received by the Bluetooth communication unit 202 with the password received by the NFC communication unit 201 and obtains the target data (Step S1305).

Thereafter, the output application 203 instructs the printer unit 206 to output, i.e., print, the target data (Step S1306). After the printer unit 206 prints the target data, the output application 203 deletes the password and the encrypted data from the data storage unit 208 (Step S1307).

As explained above, the target data is encrypted by the client terminal 610 and the encrypted data thus obtained is stored in the portable terminal device 600 and transferred to the MFP 200. In addition, the MFP 200 decrypts the encrypted data with the password received from the portable terminal device 600 by the NFC communication, and outputs the target data obtained by the decryption. Because the information processing is performed in this manner, the target data generated by the client terminal 610 can be output by the MFP 200 easily without being intercepted by a third party.

The computer program executed by the client terminal 610 is stored beforehand in, for example, a ROM. The computer program can be stored as an installable or executable file in a computer-readable recoding medium such as a CD-ROM, an FD, a CD-R, or a DVD.

The computer program executed by the client terminal 610 can be stored in a computer connectable to a network such as the Internet such that the computer program can be downloaded via the network. Alternatively, the computer program can be delivered or distributed via a network such as the Internet.

The computer program executed by the client terminal 610 has a module configuration and includes each unit such as the NFC communication unit 611, the document application 614, the data storage unit 613, and the communication control unit 612. As hardware, a CPU reads the computer program from the ROM and executes the computer program, so that the units of the client terminal 610 are loaded and realized on a main storage unit.

According to an aspect of the present invention, it is easy to input decryption information used for decrypting encrypted data.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing system comprising:
a portable terminal device; and
an information processing apparatus,
the portable terminal device including
  a first communication unit that establishes wireless communication with the information processing apparatus when the information processing apparatus is present within a first communication range, and that transmits encrypted data to the information processing apparatus; and
  a second communication unit that establishes communication with the information processing apparatus when the information processing apparatus is present within a second communication range shorter than the first communication range, and that transmits decryption information used for decrypting the encrypted data to the information processing apparatus, and the information processing apparatus including a third communication unit that establishes wireless communication with the portable terminal device based on a first communication protocol same as that of the first communication unit when the portable terminal device is present within the first communication range, and that receives the encrypted data from the portable terminal device;

a fourth communication unit that establishes communication with the portable terminal device based on a second communication protocol same as that of the second communication unit when the portable terminal device is present within the second communication range, and that receives the decryption information from the portable terminal device; and a decryption unit that decrypts the encrypted data received by the third communication unit with the decryption information received by the fourth communication unit.

2. The information processing system according to claim 1, wherein the first communication unit transmits first identification information that identifies the decryption information to the information processing apparatus together with the encrypted data, the second communication unit transmits second identification information that identifies the decryption information to the information processing apparatus together with the decryption information, the third communication unit receives the first identification information from the portable terminal device together with the encrypted data, the fourth communication unit receives the second identification information from the portable terminal device together with the decryption information, and when the first identification information and the second identification information are identical to each other, the decryption unit decrypts the encrypted data with the decryption information.

3. An information processing apparatus for communicating wirelessly with a portable terminal device including a first communication unit and a second communication unit, the information processing apparatus comprising:

a third communication unit that establishes wireless communication with the portable terminal device based on a first communication protocol same as that of the first communication unit when the portable terminal device is present within a first communication range, and receives encrypted data from the portable terminal device;

a fourth communication unit that establishes communication with the portable terminal device based on a second communication protocol same as that of the second communication unit when the portable terminal device is present within a second communication range shorter than the first communication range, and receives decryption information from the portable terminal device; and a decryption unit that decrypts the encrypted data received by the third communication unit with the decryption information received by the fourth communication unit.

4. The information processing apparatus according to claim 3, wherein the third communication unit receives first identification information from the portable terminal device together with the encrypted data, the fourth communication unit receives second identification information from the portable terminal device together with the decryption information, and when the first identification information and the second identification information are identical to each other, the decryption unit decrypts the encrypted data with the decryption information.

5. A method of information processing performed by an information processing apparatus for communicating wirelessly with a portable terminal device including a first communication unit and a second communication unit, the information processing apparatus including a third communication unit, a fourth communication unit and a decryption unit, the method of information processing comprising:

first establishing, by the third communication unit, wireless communication with the portable terminal device based on a first communication protocol same as that of the first communication unit when the portable terminal device is present within a first communication range, and receiving encrypted data from the portable terminal device;

second establishing, by the fourth communication unit, communication with the portable terminal device based on a second communication protocol same as that of the second communication unit when the portable terminal device is present within a second communication range shorter than the first communication range, and receiving decryption information from the portable terminal device; and decrypting, by the decryption unit, the encrypted data received by the third communication unit with the decryption information received by the fourth communication unit.

6. The method according to claim 5, wherein the first establishing step includes receiving first identification information from the portable terminal device together with the encrypted data, the second establishing step includes receiving second identification information from the portable terminal device together with the decryption information, and the decrypting step includes decrypting the encrypted data with the decryption information when the first identification information and the second identification information are identical to each other.

* * * * *